Aug. 18, 1942.    A. E. FOCKE    2,293,029
CHAIN
Filed May 25, 1939
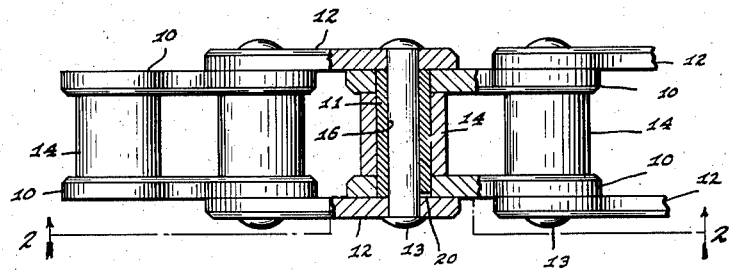
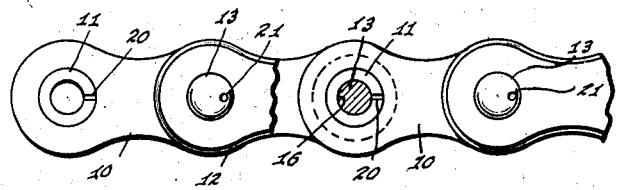
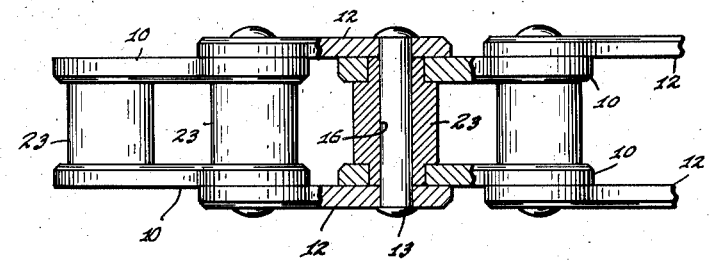
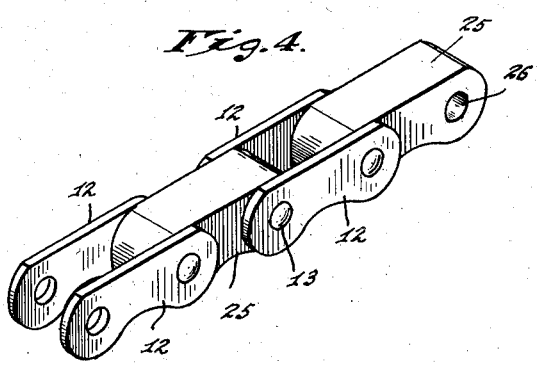
INVENTOR.
ARTHUR E. FOCKE,
BY
ATTORNEYS.

Patented Aug. 18, 1942

2,293,029

UNITED STATES PATENT OFFICE 2,293,029

CHAIN

Arthur E. Focke, Indianapolis, Ind., assignor to Diamond Chain and Manufacturing Company, Indianapolis, Ind., a corporation of Indiana Application May 25, 1939, Serial No. 275,715

9 Claims. (Cl. 74—255)

REISSUED

My invention relates to chains, especially power-transmission chains, and has for its object the improvement of the wearing qualities and/or the strength of such chains.

The design of a chain of the type with which my invention is concerned is usually a compromise between wear-resistance and strength. Certain parts of the chain are subject to both wear and stress; and, in the steels of which chain elements are commonly formed, strength and wear-resistance are, to an extent, incompatible properties. That is, a chain element of a steel selected or treated to obtain maximum strength will be relatively susceptible to wear; and, conversely, a chain element of a steel selected or treated to obtain maximum wear-resistance will be relatively weak. I use the term strength herein to denote not only resistance to steady loads but also resistance to fatigue and shock. Through the practice of my invention, I am enabled to make chain elements possessing the usually incompatible properties of relatively great strength and relatively high wear-resistance, and thus I can produce chain which, for any given strength, will possess greater wear-resistance or, for any given wear-resistance, greater strength than prior chains of which I am aware.

In the conventional roller-type chain, which for purposes of illustration may be taken as an example of common forms of chains to which my invention is applicable, bushing-links alternate with pin-links, the latter having pins which extend through the bushings of the former. As the result of flexing of the chain over its associated sprockets, wear tends to occur at the interengaging faces of the bushings and pins, such wear being localized over about one-half the circumference of those interengaging surfaces. At the same time, the pins are also subjected to bending stresses and to shear. In embodying my invention in such a chain I subject the pins, and possibly also the bushings, to a differential treatment which will increase wear-resistance at those surface portions most subject to wear while still leaving the remaining surface portions possessed of their normal, or even an enhanced, strength.

The accompanying drawing illustrates my invention: Fig. 1 is a plan of a portion of a roller-type power-transmission chain with portions thereof broken away; Fig. 2 is a side elevation of the chain with parts thereof broken away on the section line 2—2 of Fig. 1; Fig. 3 is a plan, in partial section, of a bushing-type chain; and Fig. 4 is a fragmental isometric view of a block-type chain.

The chain shown in Figs. 1 and 2 is made up of alternating pin-links and bushing-links. Each of the latter comprises a pair of spaced side plates 10 having near their ends holes for the reception of bushings 11, while each of the pin-links comprises a pair of side plates 12 having at their ends holes for the reception of pins 13. The pins 13 of the pin-links pass through the bushings 11 of the bushing-links and so serve to make a continuous chain. Rollers 14 mounted on the bushings 11 engage the teeth of the driving and driven sprockets (not shown).

In a chain such as that illustrated and described, the tension in the chain is transmitted between each pin 13 and its associated bushing 11 at that side of the pin indicated at 16 in the drawing—i. e., that side of the pin which lies nearest the center of the associated pin-link. As the chain passes over the sprockets, the bushings 11 rotate on their respectively associated pins 13; and, as a result of the load transmitted between each pin and bushing at the point indicated by the reference numeral 16 and for a distance in opposite directions from that point, a marked tendency to wear occurs.

To resist this wearing tendency it has been proposed to harden the steel pins and bushings, or at least the surface portions thereof. However, the hardening process or heat treatment best calculated to increase wear-resistance is not the heat treatment which will result in maximum strength, and vice versa. In fact, with some steels, hardening to produce maximum wear resistance may make the steel weaker than it was before treatment. As a result, a chain which has such elements as pins and bushings hardened, either throughout or uniformly over their surface portions, to produce maximum wear-resistance will be weaker than it might otherwise be. Conversely, a chain which has its element treated to produce maximum strength will be less wear-resistant than it might otherwise be.

To make a chain which will possess both satisfactory wear resistance and satisfactory strength I subject chain elements which must resist both wear and stress to a differential heat-treatment designed to produce or retain satisfactory wear resistance over surface portions subject to wear and to produce or retain satisfactory strength throughout other portions. Depending upon several factors including the size of the chain elements and the use to which the chain is to be put, the treatment of the chain elements may have for its primary purpose either the increasing of strength or the increasing of wear-resistance. If the primary purpose is to increase strength, the differential heat-treatment results in a retention, or even in an enhancement, of the effective wear-resistance; while if the primary purpose is to increase wear-resistance, the differential heat treatment results in a retention, or even in an enhancement, of strength.

In the case of roller chain, it will usually be necessary to subject only the pins to the differential heat-treatment, although the bushings may be similarly treated if desired. There are several different ways in which the pins (or bushings) may be treated to produce the desired differential characteristics. For example, if the pins or bushings are made of mild steel, as they usually are, I may increase the wear-resistance of those portions subject to wear by case-hardening such portions, confining the case-hardening to the desired portions by treating the remaining portions, as by copper-plating, to prevent the penetration thereof by carbon from the carburizing material employed in the case-hardening process. By this treatment, the pins or bushings are rendered relatively hard and wear-resistant over those surface portions where wear is most likely to occur, while the remainder of the pin or bushing is protected from such treatment, which would tend to lower strength.

Alternatively, I may harden the entire pin or bushing, or at least the entire surface portions thereof as by case-hardening, and then subject the pin or bushing to a differential tempering process, tempering those portions subject to wear to a point which will produce optimum wear resistance and those portions not subject to wear to a point where optimum strength and toughness will result. For example, I may subject the wearing portions to tempering temperatures in the neighborhood of 200°, while the remaining portions are subjected to a temperature in the neighborhood of 500°. Such differential heating of the chain elements to obtain differential tempering may be readily accomplished by known methods of heating, such as through the use of high-frequency induction, and may be employed not only to increase wear-resistance over portions subject to wear but also (and concomitantly) to increase the strength of other portions.

In assembling the chain, it is essential that the wear-resistant portion of each pin or bushing be disposed in proper relation to the associated side plates. To aid in securing this disposition of the pins or bushings, they may be provided exteriorly with indicia indicating which side thereof is the harder side. In the drawing, I have shown each bushing 11 as provided in one end with a shallow radial groove 20 on that side thereof opposite the harder portion, and each pin 13 is provided with an eccentric recess 21 near the harder portion thereof. By assembling the links of the chain with the indicia on the pins and the bushings near the center of the respectively associated links, the harder portions of the pins and bushings will be disposed in proper relationship. That is, the harder portion of each pin will be the portion thereof nearest the center of the associated link, while the harder portion of each bushing will be that disposed against the harder portion of the associated pin.

My invention is of course not limited to the particular roller-type of power-transmission chain illustrated in Figs. 1 and 2. Thus, I have illustrated in Fig. 3 a bushing-type chain in which the bushings themselves directly engage the sprockets without any interposed roller. In such a chain the bushings 30, instead of being of uniform diameter throughout their length as in the chains of Figs. 1 and 2, have a body diameter which enables them to co-operate with the associated sprockets and end portions of reduced diameter which are received in the side plates 10 of the bushing links. In such a chain, wear tends to occur most rapidly on that side of the pin indicated by the reference numeral 16, and each pin may be treated, as previously described, so that it will be relatively wear-resistant at that point and relatively strong elsewhere.

The chain shown in Fig. 4 is of the block type, in which the pin-links 12—13 are interconnected by blocks 25 having at their ends holes 26 through which the pins 13 pass. Here again each pin tends to wear most rapidly on that side thereof nearest the center of the associated pin link, and that side-portion of the pin may be treated as above described to obtain desired wear-resistance and strength. If desired, the blocks may also be differentially treated.

Whatever the type of chain, the treatment of the pins to produce differential surface characteristics results in a more satisfactory chain; for the pins are stronger and tougher than if their entire surface portions were treated to promote wear resistance and will wear better than if they were treated throughout to increase their strength and toughness. The bushings, whether of the roller-type chain of Figs. 1 and 2 or of the bushing-type chain of Fig. 3, may also be differentially treated; but, as pointed out above, the wear resistance of a bushing is a more important consideration than is its strength.

Other factors than wear-resistance and strength may influence the arrangement of the relatively hard and relatively strong portions of the chain elements. Thus the rigidity of an individual chain link depends largely upon the fit of the pins (or bushings) in the associated side bars. It is customary for the pins to have a press fit in the side bars; and in some instances, especially where the pins possess approximately the same hardness as the side bars into which they are pressed, galling occurs as the pins are pressed into the side bars and the fit consequently becomes less firm than it otherwise might be. The possibility of galling may be reduced if the pin-ends which enter the side bars, or at least the cylindrical surface portions of such pin-ends, are made harder than the side bars. By any of the methods above described the cylindrical surface of the pin may be made relatively hard throughout its circumference at the ends of the pin and over a portion of its circumference between such ends, the remaining portions of the pin being relatively stronger and softer.

I claim as my invention:

1. A power-transmission chain, comprising alternating pin-links and bushing-links, each of said bushing-links comprising two spaced bushings and each of said pin-links comprising two spaced pins passing respectively through bushings of adjacent bushing-links, that surface portion of each pin nearest the center of the pin-link being harder than the remainder of the pin and the adjacent surface portion of the associated bushing being harder than the remainder of such bushing.

2. A power-transmission chain, comprising alternating pin-links and bushing-links, each of said bushing-links comprising two spaced bushings and each of said pin-links comprising two spaced pins passing respectively through bushings of adjacent bushing-links, that inner surface portion of each bushing nearest the adjacent end of the bushing-link being harder than the remainder of the bushing.

3. The invention set forth in claim 2 with the addition that each bushing is provided exteriorly with indicia indicating which surface portion thereof is the harder.

4. The invention set forth in claim 2 with the addition that each bushing is provided on at least one end surface with indicia indicating which surface portion thereof is the harder.

5. A power-transmission chain, comprising a series of interconnected links, alternate ones of said links being pin-links comprising spaced pins which pass through end portions of the other links, that surface portion of each pin nearest the center of the pin link being harder than the remainder of the pin.

6. A power-transmission chain, comprising a series of interconnected links, alternate ones of said links being pin-links comprising spaced pins which pass through end portions of the other links, that surface portion of each pin nearest the center of the pin link being more wear-resistant and less strong than the remainder of the pin.

7. The invention set forth in claim 6 with the addition that each pin is provided exteriorly with indicia indicating which surface portion thereof is the harder.

8. The invention set forth in claim 6 with the addition that each pin is provided on at least one end surface with indicia indicating which surface portion thereof is the harder.

9. A power-transmission chain, comprising a series of interconnected links, alternate ones of said links being pin-links comprising side bars and spaced pins whose end portions pass through the side bars and whose intermediate portions are received in end portions of the other links, the surface portions of the pins at the ends thereof and the surface portion of the pin between the side bars and nearest the center of the pin link being harder than the remaining portions of the pin.

ARTHUR E. FOCKE.